(12) United States Patent
Zhou et al.

(10) Patent No.: US 9,337,928 B2
(45) Date of Patent: *May 10, 2016

(54) TIME-DOMAIN BASED COMPOSITE MODULATION FOR SPECTRALLY EFFICIENT OPTICAL NETWORKS

(71) Applicant: AT&T Intellectual Property I, L.P., Atlanta, GA (US)

(72) Inventors: Xiang Zhou, Holmdel, NJ (US); Peter Magill, Freehold, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/477,435

(22) Filed: Sep. 4, 2014

(65) Prior Publication Data

US 2015/0326338 A1 Nov. 12, 2015

Related U.S. Application Data

(63) Continuation of application No. 13/307,716, filed on Nov. 30, 2011, now Pat. No. 8,855,495.

(51) Int. Cl.
| | |
|---|---|
| *H04B 10/116* | (2013.01) |
| *H04B 10/516* | (2013.01) |
| *H04J 14/08* | (2006.01) |
| *H04J 3/06* | (2006.01) |
| *H04J 9/00* | (2006.01) |
| *H04L 7/06* | (2006.01) |

(52) U.S. Cl.
CPC ............ *H04B 10/116* (2013.01); *H04B 10/516* (2013.01); *H04B 10/5161* (2013.01); *H04J 14/08* (2013.01); *H04J 3/0605* (2013.01); *H04J 9/00* (2013.01); *H04L 7/06* (2013.01)

(58) Field of Classification Search
CPC ............. H04B 10/5161; H04B 10/116; H04B 10/516; H04J 14/08; H04J 9/00; H04J 3/0605; H04L 7/06
USPC ....................................................... 398/172
See application file for complete search history.

(56) References Cited

U.S. PATENT DOCUMENTS

| 8,238,225 B2 | 8/2012 | Wennstrom |
| 2011/0299445 A1 | 12/2011 | Calvanese Strinati |

*Primary Examiner* — Leslie Pascal
(74) *Attorney, Agent, or Firm* — Chiesa Shahinian & Giantomasi PC

(57) ABSTRACT

Methods, systems, and apparatuses for time-based composite modulation of an optical carrier signal are provided. Time-based composite modulation includes determining a plurality of fixed time slots for the optical carrier signal, wherein the plurality of fixed time slots comprise a time-division-multiplexing frame. Determining a modulation format for each fixed time slot of the time-division-multiplexing frame, wherein a transport spectral efficiency of the modulation format determined for a first fixed time slot is different from a transport spectral efficiency of the modulation format determined for a second fixed time slot, and determining a number of binary bits for each fixed time slot of the time-division-multiplexing frame, wherein the number of binary bits for a fixed time slot is based on the modulation format determined for the fixed time slot.

15 Claims, 4 Drawing Sheets

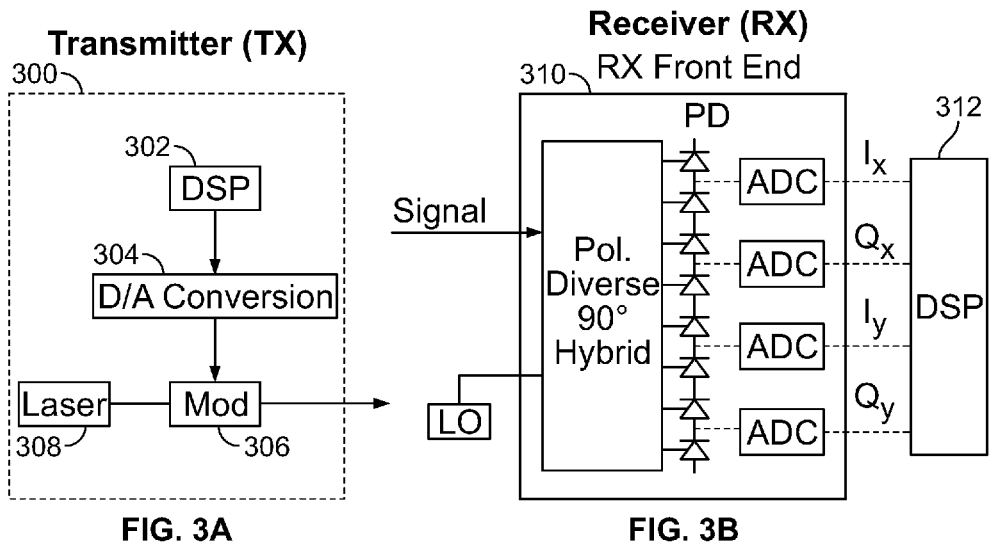
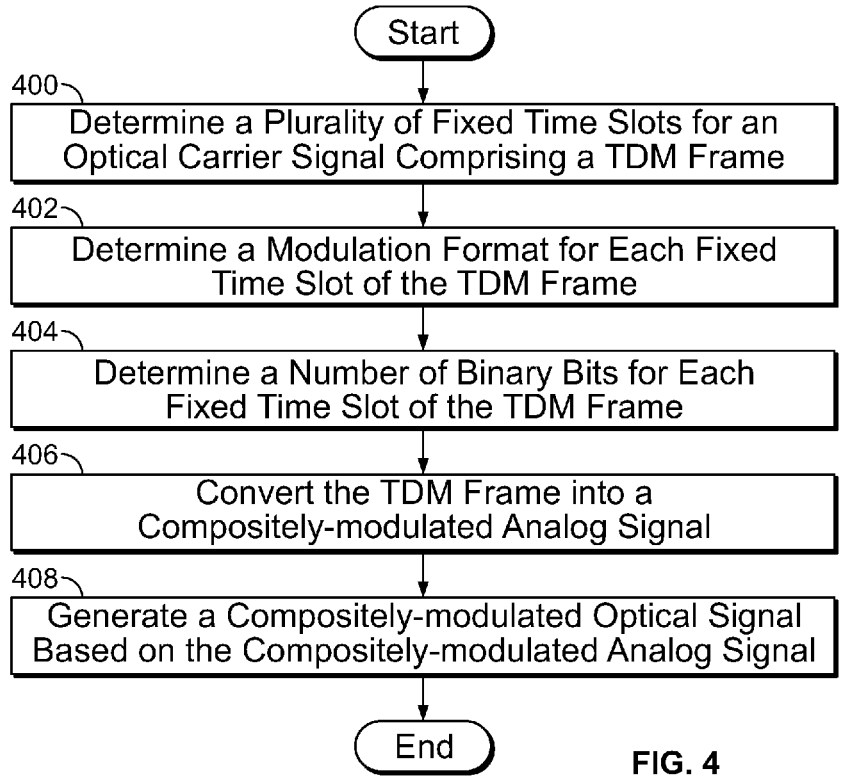

TIME-DOMAIN BASED COMPOSITE MODULATION FOR SPECTRALLY EFFICIENT OPTICAL NETWORKS

CROSS REFERENCE TO RELATED APPLICATIONS

This application is a continuation of U.S. patent application Ser. No. 13/307,716, filed Nov. 30, 2011, now U.S. Pat. No. 8,855,495, issued on Oct. 7, 2014, incorporated herein by reference.

TECHNICAL FIELD

This specification relates generally to optical carrier signal modulation, and more particularly to methods for time-domain based modulation.

BACKGROUND

A major force driving the technology evolution of fiber-optic transport networks is the desire to lower the cost per transmitted bit. With the rapid growth of capacity demands and limited available optical bandwidth, maximizing transport spectral efficiency is becoming increasingly important for lowering such costs. One focus of transport spectral efficiency is to improve on the capacity limitations of common network infrastructure, such as the fiber-optic cable.

In recent years, various high-order modulation formats with different optical reach capabilities have been proposed for increasing transport spectral efficiency. However, many of these approaches put a severe limitation on the design of optical networks, where a variety of reach demands may be required for different wavelength channels and at different points in time.

SUMMARY

A time-domain based composite modulation method using a single carrier is presented. The method is capable of achieving an arbitrary transport spectral efficiency, and therefore enables maximized spectral efficiency for any reach demand in an optical network. This capability can help to improve optical signal transport economics by allowing for a more uniform trade-off between cost per transmitted bit and reach.

In accordance with an embodiment, a method for time-based composite modulation is provided. An optical carrier signal is received and a plurality of fixed time slots for the optical carrier signal are determined, wherein the plurality of fixed time slots comprise a time-division-multiplexing frame. A modulation format is determined for each fixed time slot of the time-division-multiplexing frame, wherein a transport spectral efficiency of the modulation format determined for a first fixed time slot is different from a transport spectral efficiency of the modulation format determined for a second fixed time slot. A number of binary bits are determined for each fixed time slot of the time-division-multiplexing frame, wherein the number of binary bits for a fixed time slot is based on the modulation format determined for the fixed time slot.

In accordance with an embodiment, the modulation format determined for a fixed time slot may be one of a PDM-4QAM, PDM-8QAM, PDM-16QAM, PDM-32QAM and PDM-64QAM modulation format.

In accordance with an embodiment, a frame sync marker for the time-division-multiplexing frame is generated, wherein the frame sync marker indicates the modulation format determined for at least one fixed time slot of the time-division-multiplexing frame.

In accordance with an embodiment, a packet comprising at least one time-division-multiplexing frame is generated, and a modulation format is determined for each fixed time slot of the packet.

These and other advantages of the present disclosure will be apparent to those of ordinary skill in the art by reference to the following detailed description and the accompanying drawings.

BRIEF DESCRIPTION OF THE DRAWINGS

FIG. 3A is a diagram showing the structure of a time-division-multiplexing (TDM) transmitter in accordance with an embodiment;

FIG. 3B is a diagram showing the structure of a time-division-multiplexing (TDM) receiver in accordance with an embodiment;

FIG. 4 is a flowchart of a process for determining time-domain based composite modulation in accordance with an embodiment;

DETAILED DESCRIPTION

Figure 1:
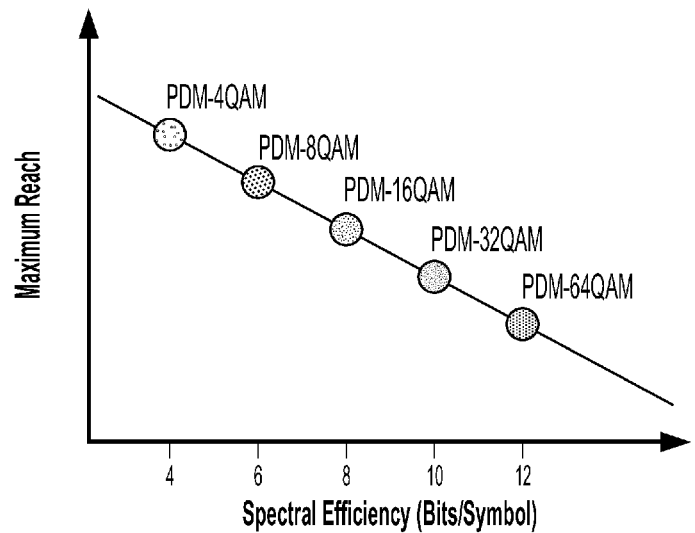
FIG. 1 is a diagram showing typically realizable PDM M-ary QAM transport spectral efficiencies.

FIG. 1 is a diagram showing typically realizable PDM M-ary QAM transport spectral efficiencies. One way to increase transport spectral efficiency is to use polarization-division-multiplexed (PDM) high-order M-ary quadrature amplitude modulation (QAM). The achievable spectral efficiency for an M-ary modulation format is given by $2 \log_2 M$ using PDM, where M is typically required to be equal to $2^k$ (k is an integer number) for practical implementation consideration. As shown, using a single PDM M-ary QAM typically limits achievable transport spectral efficiencies (sometimes denoted as "SE" or "SEs" herein) to discrete even numbers (e.g., SE=4 for k=2, SE=6 for k=3, and SE=9 for k=4, etc.), implying that the optimal spectral efficiency cannot be realized for many reach demands by using a single PDM M-ary QAM. This limitation often translates into poorer transport economics because the reach demands in a fully dynamic optical network can be quite different for different wavelength channels. Even for the same wavelength channel, the reach demand may also vary over time.

To realize an "arbitrary" (i.e., maximized) spectral efficiency for optical transport, a time-domain based composite modulation method is provided. The method applies different modulation formats with different SEs to the same optical carrier signal, but at different time slots. Due to the use of a single carrier signal, the method enables a lower signal peak-to-average power ratio (e.g., as compared to typical orthogonal frequency-division multiplexing (OFDM) based methods) and therefore can improve tolerance of fiber nonlinearities. Furthermore, the method is more tolerant toward laser phase noise because the symbol period is much shorter than frequency-domain based composite modulation methods.

Figure 2:
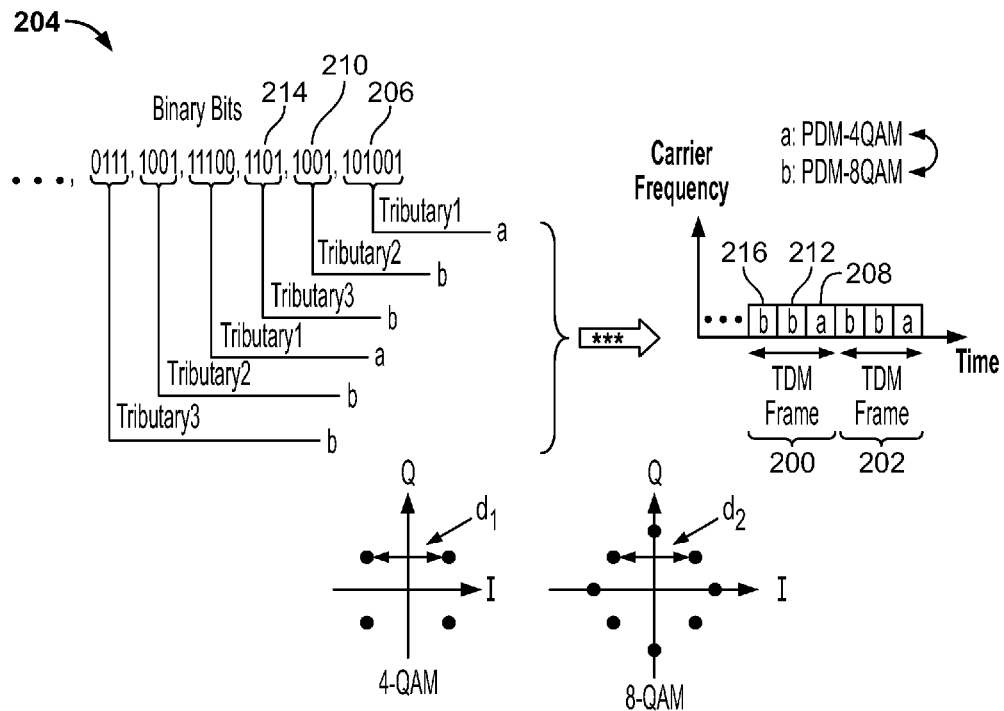
FIG. 2 is a diagram showing the structure of a time-division-multiplexing (TDM) frame in accordance with an embodiment.

FIG. 2 is a diagram showing the structure of time-division-multiplexing (TDM) frames in accordance with an embodiment. Frames 200 and 202 include a plurality of serial high-speed binary bits 204, which are divided among the fixed time slots (i.e., tributaries) of TDM frames 200 and 202. In one embodiment, TDM frames 200 and 202 may each include three fixed time slots. The binary bits 204 may be apportioned among the fixed time slots based on the modulation format determined for each fixed time slot. While one skilled in the art will appreciate that the methods described herein are suitable for any number of frame and modulation formats, for ease of understanding, TDM frames 200 and 202 are constructed using two standard modulation formats, PDM-4QAM and PDM-8QAM. For example, the first 6 binary bits 206 can be assigned to the first fixed time slot 208 of frame 200, which is mapped into a single PDM-8QAM symbol. The second 4 binary bits 210 can be assigned to the second fixed time slot 212, which is mapped into a single PDM-4QAM symbol. Likewise, the third 4 binary bits 214 can be assigned to the third fixed time slot 216, which is mapped into another PDM-4QAM symbol. After all of the binary bits are mapped to a corresponding PDM-M-QAM symbol, each TDM frame 200 and 202 of the compositely modulated signal consists of one PDM-M-8QAM symbol and two PDM-4QAM symbols, achieving a net transport SE given by:

$$(\frac{1}{3}) \cdot SE(PDM\text{-}8QAM) + (\frac{2}{3}) \cdot SE(PDM\text{-}4QAM) = 14/3;$$

where SE(x) denotes the theoretical SE of x in terms of the number of bits per symbol.

For such a time-domain based composite modulation method, if a TDM frame consists of L time slots (time slot length=a symbol period), and of which N time slots are assigned with modulation format 1 and the other L-N time slots are assigned with modulation format 2, then the net SE is given by:

$$(N/L) \cdot SE(\text{format 1}) + (1 - N/L) \cdot SE(\text{format 2}).$$

As such, an arbitrary SE can be achieved by using two modulation formats with appropriate values of L and N, when the demanded SE is located between the SE of modulation format 1 and the SE of modulation format 2.

In one embodiment, the Euclidean distances for constellation points of the individual (or component) modulation formats used in the proposed composite modulation method (e.g. $d_1$ and $d_2$ in FIG. 2) can be designed to be either identical or different from each other. In the case of a linear transmission channel, an equal Euclidean distance might give better performance than unequal Euclidean distance. For a nonlinear transmission channel, such as a fiber-optic transmission channel, however, an unequal Euclidean distance might yield better nonlinear tolerance. An unequal Euclidean distance design may also help improve phase noise tolerance. In one embodiment, the Euclidean distances of the component modulation formats may be optimized to improve the overall nonlinear tolerance and/or phase noise tolerance. Moreover, the distribution of the component modulation formats across a TDM frame can also be optimized to improve the nonlinear tolerance as well as forward error correction (FEC) coding gain. Generally, a better nonlinear performance may be achieved by interleaving a higher-SE component modulation format with a lower-SE component modulation format (e.g., ababab or abbabb, where a denotes component modulation 1 and b denotes component modulation 2). Such interleaving may also improve the laser phase tolerance for optical communication systems using coherent detection. Furthermore, a joint design and optimization of FEC coding and time-domain composite modulation may enhance the overall performance or simplify the FEC decoding (thus reduce latency) by exploiting the knowledge of different component modulation formats having different probabilities of error.

In another embodiment, a frame sync marker for the time-division-multiplexing frame is generated indicating the modulation format for at least one fixed time slot of the time-division-multiplexing frame. For example, the frame sync marker may indicate the modulation formats within a TDM frame to a decoder to decrease decoding latency.

FIG. 3A is a diagram showing the structure of a time-division-multiplexing (TDM) transmitter and FIG. 3B is a diagram showing the structure of TDM receiver in accordance with an embodiment. In FIG. 3A, at transmitter 300, the time-domain based composite modulation method can be implemented using digital methods. For example, a CMOS-based digital signal processing (DSP) module 302 can be configured to generate a compositely-modulated electrical signal. Digital-to-analog converter 304 can be configured to convert the digital signal into an analog signal, which then can be used to drive optical modulator 306 to generate (in conjunction with laser 308) a compositely-modulated optical signal. The compositely-modulated optical signal may then be received at receiver 310 shown in FIG. 3B. Receiver 310 can be configured to detect and demodulate the compositely-modulated optical signal using, for example, means for digital coherent detection such as receiving CMOS-based DSP module 312.

FIG. 4 is a flowchart of a process for determining time-domain based composite modulation in accordance with an embodiment. In one embodiment, processing module 302 may include circuits configured to perform operations for generating a compositely-modulated digital signal. For example, At 400, processing module 302 determines a plurality of fixed time slots for an optical carrier signal, wherein the fixed time slots 208, 212, and 216 comprise a TDM frame 200, such as TDM frame 200 in FIG. 2 above. At 402, processing module 302 determines a modulation format for each fixed time slot of the time-division-multiplexing frame. For example, the modulation format determined for a fixed time slot may be one of a PDM-4QAM, PDM-8QAM, PDM-16QAM, PDM-32QAM and PDM-64QAM modulation format, or another known modulation format. Further, the modulation format determined for a first fixed time slot can be different from the modulation format determined a second fixed time slot. As shown in FIG. 2, fixed time slot 208 is a PDM-8QAM time slot, while fixed time slot 212 is a PDM-4QAM time slot. At 404, processing module 302 determines a number of binary bits for each fixed time slot of the time-division-multiplexing frame. Specifically, the number of binary bits for a fixed time slot is based on the modulation format determined for the fixed time slot. For example, the PDM-4QAM time slots in FIG. 2 include 4 binary bits each, while the PDM-8QAM time slots include 6 binary bits.

As shown in FIG. 3A above, digital-to-analog converter 304 includes a digital signal input coupled to an output of processing module 302, and provides an analog signal output. As such, at 406, digital-to-analog converter 304 converts the TDM frame, a compositely-modulated digital signal generated by processing module 302, into a compositely-modulated analog signal which is received by optical modulator 306. For example, optical modulator 306 includes an analog signal input coupled to the analog signal output of digital-to-analog converter 304 for receiving compositely-modulated analog signals, and provides an optical signal output. At 408, optical modulator 306 generates a compositely-modulated optical signal, in conjunction with laser 308 based on the compositely-modulated analog signal converted by digital-to-analog converter 304.

Figure 5:
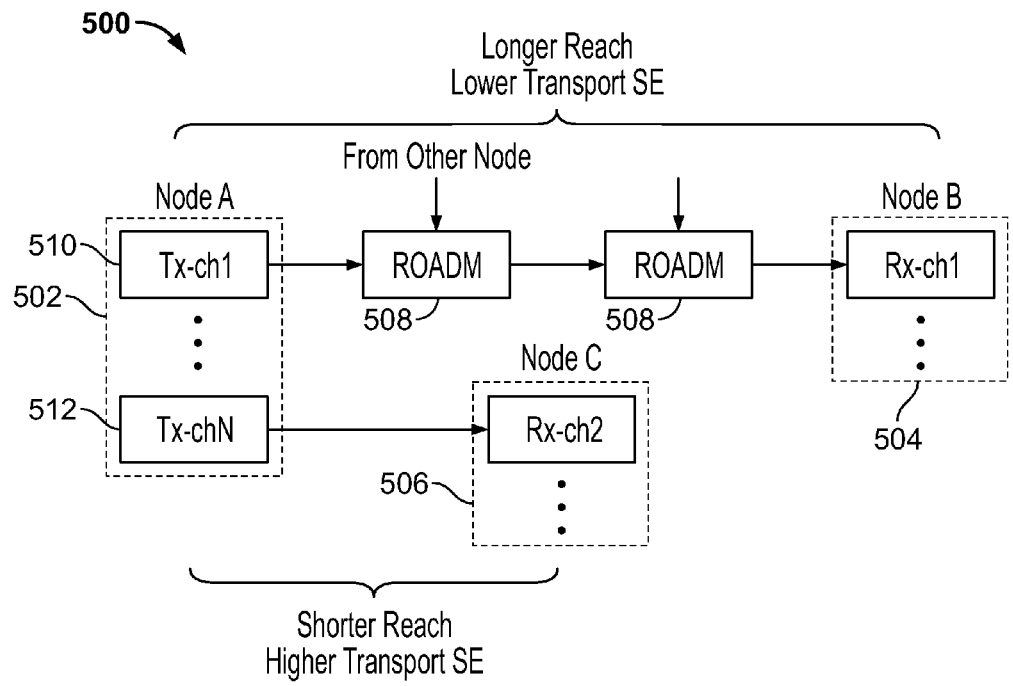
FIG. 5 is a diagram showing a reconfigurable optical add-drop multiplexer (ROADM) based optical network environment for implementing time-domain based composite modulation in accordance with an embodiment.

FIG. 5 is a diagram showing a reconfigurable optical add-drop multiplexer (ROADM) based optical network environment for implementing time-domain based composite modulation in accordance with an embodiment. For example, network 500 includes transmitter node 502 and receiving nodes 504 and 506, which are located at various transmission distances from transmitter node 502. Network 500 may also include one or more ROADMs 508 for individual or multiple wavelengths carrying data channels transmitted from transmitter node 502 (or other nodes) to be added or dropped from a transport fiber. In such a network, it would be advantageous to optimize spectral efficiency based on transmission reach (and other line system conditions) with the time-domain based composite modulation method of FIG. 2. For example, a method for optimizing spectral efficiency can be advantageous when the transmission reach between transmitter node 502 and a first receiver node 504 is longer (with lower transport spectral efficiency) than the transmission reach between transmitter node 502 and a second receiver node 506. In such cases, the method can be employed by transmitter 502 to realize maximum SE for each wavelength channel 510 and 512 for the reach demands of transmitting to receiver nodes 504 and 506, respectively.

Figure 6:
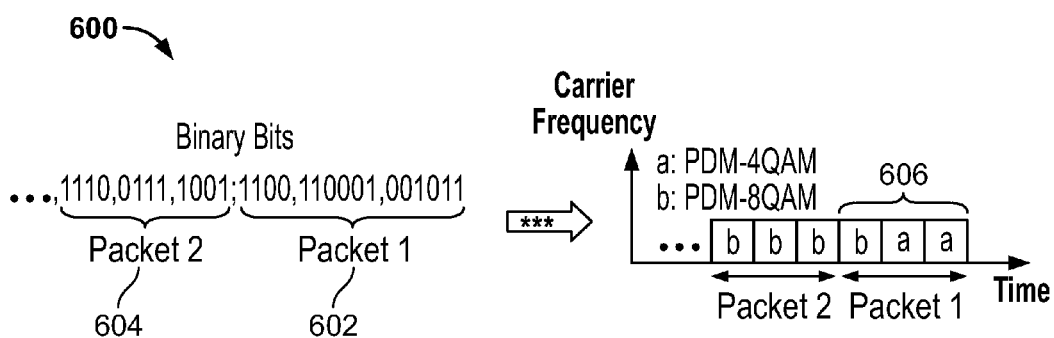
FIG. 6 is a diagram showing the structure of time-division-multiplexing (TDM) packets in accordance with an embodiment.

FIG. 6 is a diagram showing the structure of time-division-multiplexing (TDM) packets in accordance with an embodiment. In one embodiment, binary bits 600 can be grouped into packets based on transmission reach or other demands. For example, packets 602 and 604 may have different destinations and therefore the transmission reach demands. To maximize the transport SE for each individual packet, different modulation formats may be applied to different packets using the time-domain based composite modulation method of FIG. 2. Moreover, within each packet, more than one modulation format may be applied using the method of FIG. 2 as shown at 606.

Figure 7:
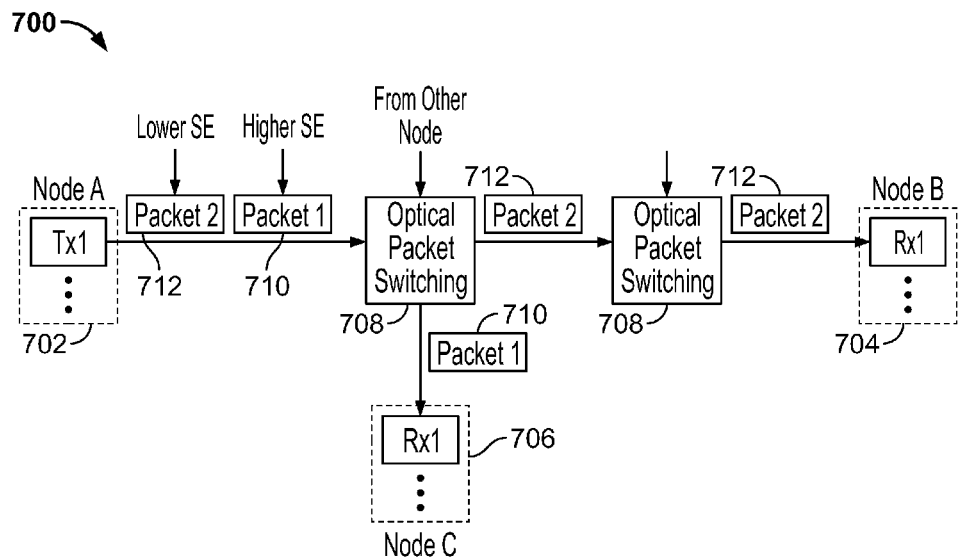
FIG. 7 illustrates a packet-switched optical network for implementing time-domain based composite modulation in accordance with an embodiment.

FIG. 7 illustrates a packet-switched optical network for implementing time-domain based composite modulation in accordance with an embodiment. Packet-switched optical communication network 700 includes transmitter node 702 and receiving nodes 704 and 706, which are located at various transmission distances from transmitter node 702. Network 700 may also include one or more optical packet switches 708 for adding or dropping packets from a transport fiber. In network 700, the transport SE of any individual packet can be optimized using the time-domain based composite modulation method of FIG. 2 based on transmission reach or other demands. For example, the transport SE of Packet 1 710 can be optimized using the time-domain based composite modulation method of FIG. 2 based on the higher SE transmission reach between transmitter node 702 and receiver node 706. Likewise, the transport SE of Packet 2 712 can be optimized using the method of FIG. 2 based on the lower SE transmission reach between transmitter node 702 and receiver node 704.

As such, a time-domain based composite modulation method is provided for various high-spectral-efficiency and high-speed optical networks. One skilled in the art will appreciate that the network examples of FIGS. 5 and 7 are illustrative and that the method of FIG. 2 may be employed in a variety of other networks. Moreover, it will be appreciated that the method also may be employed in a combination of different types of networks.

The method allows for arbitrary transport spectral efficiency by using a single carrier with multiple common M-ary ($M=2^k$, k is an integer number) modulation formats that each have a different SE because they have a different number of bits per symbol. Moreover, a transmission can be at a fixed modulation rate (baud) to minimize implementation costs. The method maximizes the transport SE for any transmission reach (e.g., maximum transmission distance without regeneration), thus reducing the cost per transmitted bit.

Unlike frequency-domain based composite modulation methods, where different modulation formats are applied to different subcarriers, the method applies different modulation formats to a single carrier, but in different time slots (where a one time slot is equal to a symbol period). Multiple adjacent time slots can be grouped to form a time-division-multiplexing (TDM) frame, and different modulation formats can be applied to different time slots within each TDM frame. The same modulation format can be applied to more than one time slot within each TDM frame when, for example, the used number of modulation formats is smaller than the number of time slots per TDM frame. Alternatively, different modulation formats can be applied to different time slots within each optical packet. Moreover, the used modulation formats and/or their distribution within each packet can differ from packet to packet, as different packets may have different reach requirements. Also, a first modulation format can be used for the packet header (probably lower SE but less error prone) and a second modulation format can be used for the packet payload (greater SE, more error prone). As compared to frequency-domain based composite modulation methods, the embodiments can enable a lower signal peak-to-average power ratio and therefore can improve fiber nonlinear tolerance. The method is also more tolerant toward laser phase noise due to the shorter symbol period.

In various embodiments, the method steps described herein, including the method steps described in FIG. 4, may be performed in an order different from the particular order described or shown. In other embodiments, other steps may be provided, or steps may be eliminated, from the described methods. In still other embodiments, the steps may be broken down into sub-steps which may, for example, be performed in parallel.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the method steps described herein, including one or more of the steps of FIG. 4. Certain steps of the methods described herein, including one or more of the steps of FIG. 4, may be performed by a server or by another processor in a network-based cloud-computing system. Certain steps of the methods described herein, including one or more of the steps of FIG. 4, may be performed by a client computer in a network-based cloud computing system. The steps of the methods described herein, including one or more of the steps of FIG. 4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIG. 4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 8:
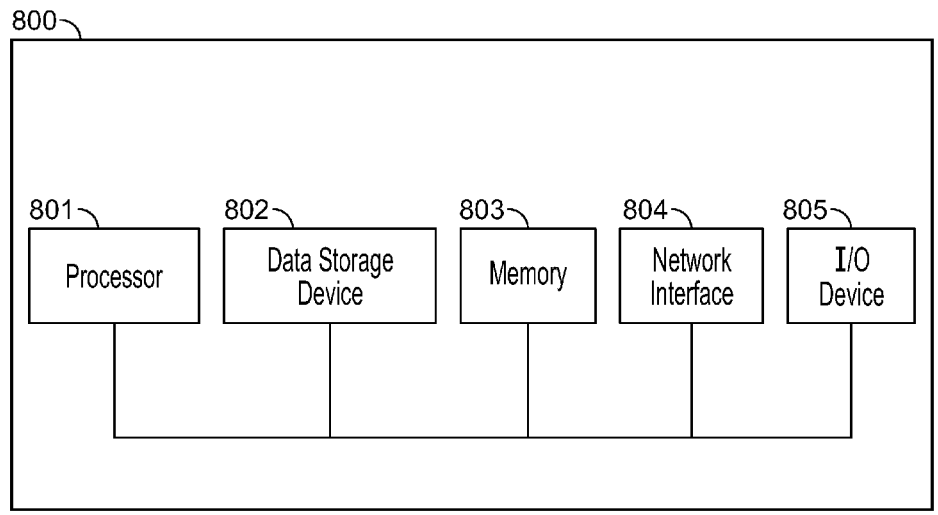
FIG. 8 is a high-level block diagram of an exemplary computer that may be used for time-domain based composite modulation.

A high-level block diagram of an exemplary computer that may be used to implement systems, apparatus and methods described herein is illustrated in FIG. 8. Computer 800 includes a processor 801 operatively coupled to a data storage device 802 and a memory 803. Processor 801 controls the overall operation of computer 800 by executing computer program instructions that define such operations. The computer program instructions may be stored in data storage device 802, or other computer readable medium, and loaded into memory 803 when execution of the computer program instructions is desired. Thus, the method steps of FIG. 4 can be defined by the computer program instructions stored in memory 803 and/or data storage device 802 and controlled by the processor 801 executing the computer program instructions. For example, the computer program instructions can be implemented as computer executable code programmed by one skilled in the art to perform an algorithm defined by the method steps of FIG. 4. Accordingly, by executing the computer program instructions, the processor 801 executes an algorithm defined by the method steps of FIG. 4. Computer 800 also includes one or more network interfaces 804 for communicating with other devices via a network. Computer 800 also includes one or more input/output devices 805 that enable user interaction with computer 800 (e.g., display, keyboard, mouse, speakers, buttons, etc.).

Processor 801 may include both general and special purpose microprocessors, and may be the sole processor or one of multiple processors of computer 800. Processor 801 may include one or more central processing units (CPUs), for example. Processor 801, data storage device 802, and/or memory 803 may include, be supplemented by, or incorporated in, one or more application-specific integrated circuits (ASICs) and/or one or more field programmable gate arrays (FPGAs).

Data storage device 802 and memory 803 each include a tangible non-transitory computer readable storage medium. Data storage device 802, and memory 803, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 805 may include peripherals, such as a printer, scanner, display screen, etc. For example, input/output devices 805 may include a display device such as a cathode ray tube (CRT) or liquid crystal display (LCD) monitor for displaying information to the user, a keyboard, and a pointing device such as a mouse or a trackball by which the user can provide input to computer 800.

Any or all of the systems and apparatus discussed herein, including transmitter 300, and components thereof, including processing module 302, digital-to-analog converter 304, and optical modulator 306 may be implemented using a computer such as computer 800.

One skilled in the art will recognize that an implementation of an actual computer or computer system may have other structures and may contain other components as well, and that FIG. 8 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present disclosure and that various modifications may be implemented by those skilled in the art without departing from the scope and spirit of this disclosure. Those skilled in the art could implement various other feature combinations without departing from the scope and spirit of this disclosure.

We claim:
1. A method comprising:
   receiving by an optical receiver an optical carrier signal;
   determining a plurality of fixed time slots defining a time-division-multiplexing frame for the optical carrier signal;
   determining a modulation format for each fixed time slot of the time-division-multiplexing frame;
   determining a number of binary bits for each fixed time slot of the time-division-multiplexing frame; and generating a frame sync marker for the time-division-multiplexing frame based on a determined modulation format.

2. The method of claim 1, wherein the modulation format determined for a fixed time slot is one of a PDM-4QAM, PDM-8QAM, PDM-16QAM, PDM-32QAM and PDM-64QAM modulation format.

3. The method of claim 1, wherein one or more time-division-multiplexing frames define a packet.

4. The method of claim 1, wherein a transport spectral efficiency of the modulation format determined for a first fixed time slot is different from a transport spectral efficiency of the modulation format determined for a second fixed time slot.

5. The method of claim 1, wherein the number of binary bits for a fixed time slot is based on the modulation format determined for the fixed time slot.

6. An apparatus comprising:
a processing module;
a non-transitory computer-readable medium storing computer program instructions for generating a compositely-modulated digital signal, which, when executed on the processing module, cause the processing module to perform operations comprising:
determining a plurality of fixed time slots defining a time-division-multiplexing frame for an optical carrier signal;
determining a modulation format for each fixed time slot of the time-division-multiplexing frame, wherein one or more time-division-multiplexing frames define a packet;
determining a number of binary bits for each fixed time slot of the time-division-multiplexing frame based on the modulation format determined for the fixed time slot to generate a compositely modulated digital signal;
a digital-to-analog converter, having a digital signal input coupled to an output of the processing module and providing an analog signal output, for converting the compositely-modulated digital signal into a compositely-modulated analog signal; and
an optical modulator, having an analog signal input coupled to the analog signal output of the digital-to-analog converter and providing an optical signal output, for generating a compositely-modulated optical signal based on the compositely-modulated analog signal.

7. The apparatus of claim 6, wherein the modulation format determined for a fixed time slot is one of a PDM-4QAM, PDM-8QAM, PDM-16QAM, PDM-32QAM and PDM-64QAM modulation format.

8. The apparatus of claim 6, further comprising computer program instructions causing the processing module to perform an operation for generating a frame sync marker for the time-division-multiplexing frame, wherein the frame sync marker indicates the modulation format determined for a fixed time slot of the time-division-multiplexing frame.

9. The apparatus of claim 6, wherein the processing module is implemented by a CMOS-based digital signal processing chip.

10. The apparatus of claim 6, wherein the processing module and the digital-to-analog converter are integrated on a CMOS-based chip.

11. A non-transitory computer-readable medium storing computer program instructions for generating a compositely-modulated digital signal, which, when executed on a processor, cause the processor to perform operations comprising:
receiving with an optical receiver an optical carrier signal;
determining a plurality of fixed time slots defining a time-division-multiplexing frame for an optical carrier signal;
determining a modulation format for each fixed time slot of the time-division-multiplexing frame;
determining a number of binary bits for each fixed time slot of the time-division-multiplexing frame; and
generating a frame sync marker for the time-division-multiplexing frame based on a determined modulation format.

12. The non-transitory computer-readable medium of claim 11 wherein the modulation format determined for a fixed time slot is one of a PDM-4QAM, PDM-8QAM, PDM-16QAM, PDM-32QAM and PDM-64QAM modulation format.

13. The non-transitory computer-readable medium of claim 11, wherein one or more time-division-multiplexing frames define a packet.

14. The non-transitory computer-readable medium of claim 11, wherein a transport spectral efficiency of the modulation format determined for a first fixed time slot is different from a transport spectral efficiency of the modulation format determined for a second fixed time slot.

15. The non-transitory computer-readable medium of claim 11, wherein the number of binary bits for a fixed time slot is based on the modulation format determined for the fixed time slot.

* * * * *